United States Patent
Hirabayashi et al.

[11] Patent Number: 6,137,259
[45] Date of Patent: Oct. 24, 2000

[54] BATTERY PACK WITH WATER LEAKAGE DETECTING SEAL

[75] Inventors: Tetsuo Hirabayashi; Ryouichi Kaiwa, both of Kanagawa, Japan

[73] Assignee: Matsushita Electric Industrial Co., Ltd., Osaka, Japan

[21] Appl. No.: 09/394,488

[22] Filed: Sep. 13, 1999

[30] Foreign Application Priority Data

Nov. 11, 1998 [JP] Japan .................................. 10-320514

[51] Int. Cl.⁷ .................................................... H01M 10/46

[52] U.S. Cl. ............................................................ 320/107

[58] Field of Search ..................................... 320/107, 112, 320/134, 136

[56] References Cited

U.S. PATENT DOCUMENTS

| | | |
|---|---|---|
| 4,650,636 | 3/1987 | Sugimoto et al. . |
| 4,677,371 | 6/1987 | Imaizumi . |
| 5,294,988 | 3/1994 | Wakabayashi et al. . |
| 5,471,658 | 11/1995 | Iacono . |

*Primary Examiner*—Edward H. Tso
*Attorney, Agent, or Firm*—Pearne & Gordon LLP

[57] ABSTRACT

There is provided a battery pack with a water leakage detecting seal comprising a protective circuit 5 for protecting a battery, a first case 6, a second case 7, and a battery cell 8, characterized in that the water leakage detecting seal 2 is arranged adjacent to the protective circuit 5 for protecting the battery in the rear of a window 3 formed in the first case 6 in such a way that the water leakage detecting seal 2 is sandwiched between the first case 6 and the second case 7.

5 Claims, 6 Drawing Sheets p: SECTION ALONG A LINE A-A p: SECTION ALONG A LINE A-A q: SECTION ALONG A LINE B-B p: SECTION ALONG A LINE A-A

BATTERY PACK WITH WATER LEAKAGE DETECTING SEAL

BACKGROUND OF THE INVENTION

The present invention relates to a battery pack to be used in a mobile radio apparatus such as a mobile telephone, a personal handy phone system (PHS) etc., and more particularly to a battery pack into which water is easy to enter, so that a quick response to a water leakage can be obtained.

Conventionally, with respect to a mobile radio apparatus such as a mobile telephone, PHS etc., there are many cases wherein a water leakage detecting seal is attached between a battery cell and a case, or between upper and lower cases. FIGS. 5 through 7 show one example of such a battery pack as constructed in this way to have the conventional water leakage detecting seal attached to the case.

FIG. 5 is a perspective view showing a structure of the conventional battery case with a water leakage detecting seal. As shown in FIG. 5, the water leakage detecting seal 12 is attached to the case of the battery pack 11. FIG. 6 is a side view in cross section taken along a line A—A in FIG. 5. In FIG. 6, the battery pack 11 is so constructed that a battery cell 17 and a protective circuit 14 for protecting the battery are provided between a case A 15 and a case B 16.

FIG. 7 is an enlarged side view in cross section of a part of FIG. 6. In FIG. 7, the water leakage detecting seal 12 is directly attached to the case B 16 between the battery cell 17 and the case B 16 just below a window 13.

In the conventional structure as shown in FIG. 7, a gap between the water leakage detecting seal and the case B must be as small as possible in order to prevent the seal from being peeled off by a pressure from the outside through the window 13. For this reason, water is hard to enter into the gap so as to reach the water leakage detecting seal 12, and a problem lies in that the detecting seal is too slow to respond to the water leakage.

SUMMARY OF THE INVENTION

In order to solve the above described problem, it is an object of the present invention to provide a battery pack with a water leakage detecting seal which is yieldable to an intrusion of water and quick in responding to the water leakage.

The battery pack according to the present invention comprises a protective circuit for protecting a battery, a first case, a second case, and a battery cell, and is characterized in that a water leakage detecting seal is arranged adjacent to the protective circuit for protecting the battery in the rear of a window formed in the first case in such a way that the water leakage detecting seal is sandwiched between the first case and the second case.

The invention according to aspect 1 of the present invention lies in a battery pack with a water leakage detecting seal comprising a protective circuit for protecting a battery, a first case, a second case, and a battery cell, characterized in that the water leakage detecting seal is arranged adjacent to the protective circuit for protecting the battery in the rear of a window formed in the first case in such a way that the water leakage detecting seal is sandwiched between the first case and the second case. With this structure, intrusion of water will be made easy and a quick response to a water leakage can be obtained.

According to aspect 2 of the present invention, there is provided a battery pack with a water leakage detecting seal as in aspect 1, wherein a portion of the water leakage detecting seal is extended to an area adjacent to the protective circuit. With this structure, the detecting seal can readily respond to the water leakage in the protective circuit.

According to aspect 3 of the present invention, there is provided a battery pack with a water leakage detecting seal as in aspect 1, wherein the first case is provided with grooves, so that the water leakage detecting seal is easy to respond to water running through the grooves. With this structure water can easily intrude into the grooves and a quick response to the water leakage can be obtained.

According to aspect 4 of the present invention, there is provided a battery pack with a water leakage detecting seal as in aspect 1, wherein a face of the first case facing with the water leakage detecting seal except the grooves is parallel to the window, so that the water leakage detecting seal will not be peeled off with a pressure from the outside through the window.

According to aspect 5 of the present invention, there is provided a mobile radio apparatus provided with a battery pack with a water leakage detecting seal as in aspects 1 to 4. Into such a mobile radio apparatus, an intrusion of water will be made easy and a quick response to the water leakage can be obtained.

DETAILED DESCRIPTION OF THE PREFERRED EMBODIMENTS

Now, the present invention will be described by way of example with reference to the drawings.

Figure 1:
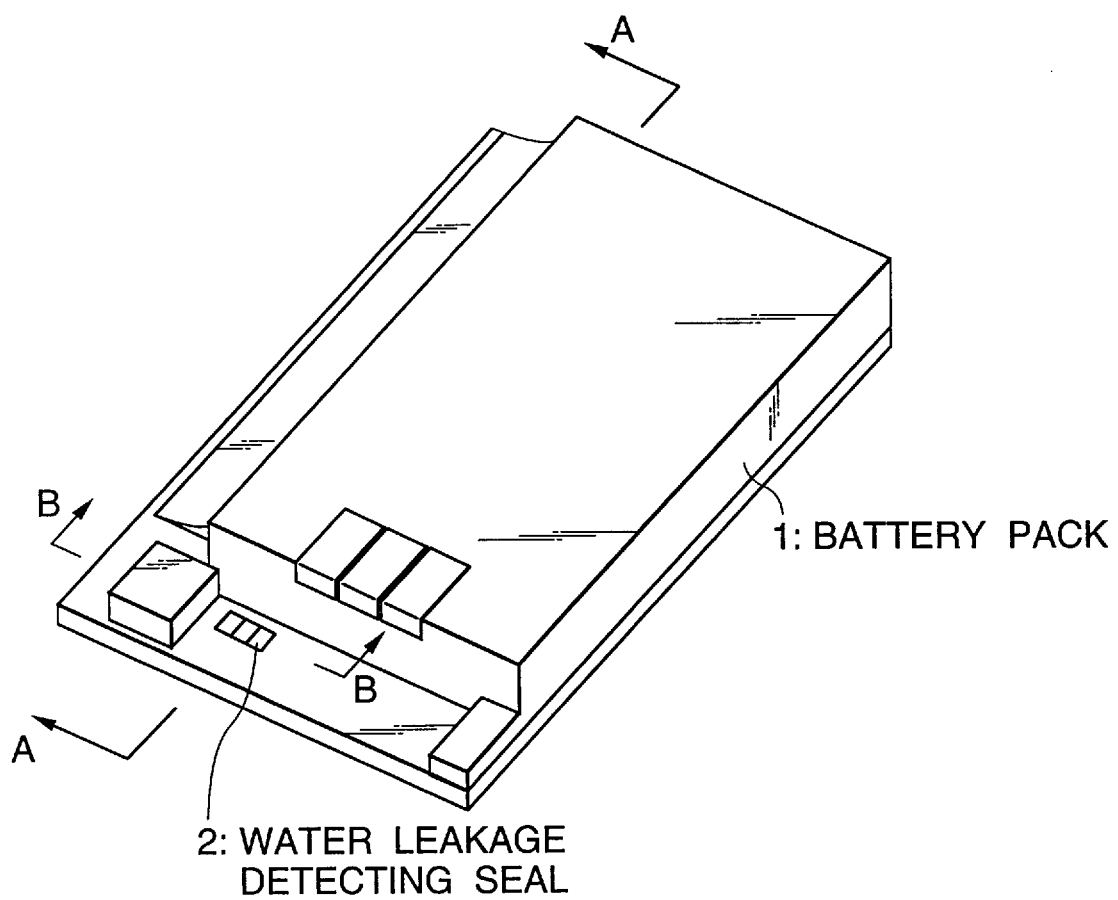
FIG. 1 is a perspective view showing a structure of a battery pack with a water leakage detecting seal according to one embodiment of the present invention.

FIG. 1 is a perspective view showing a structure of a battery pack with a water leakage detecting seal according to one embodiment of the present invention. As shown in FIG. 1, in the battery pack 1 according to the embodiment of the present invention, the water leakage detecting seal 2 is attached to a case adjacent to a protective circuit.

Figure 2:
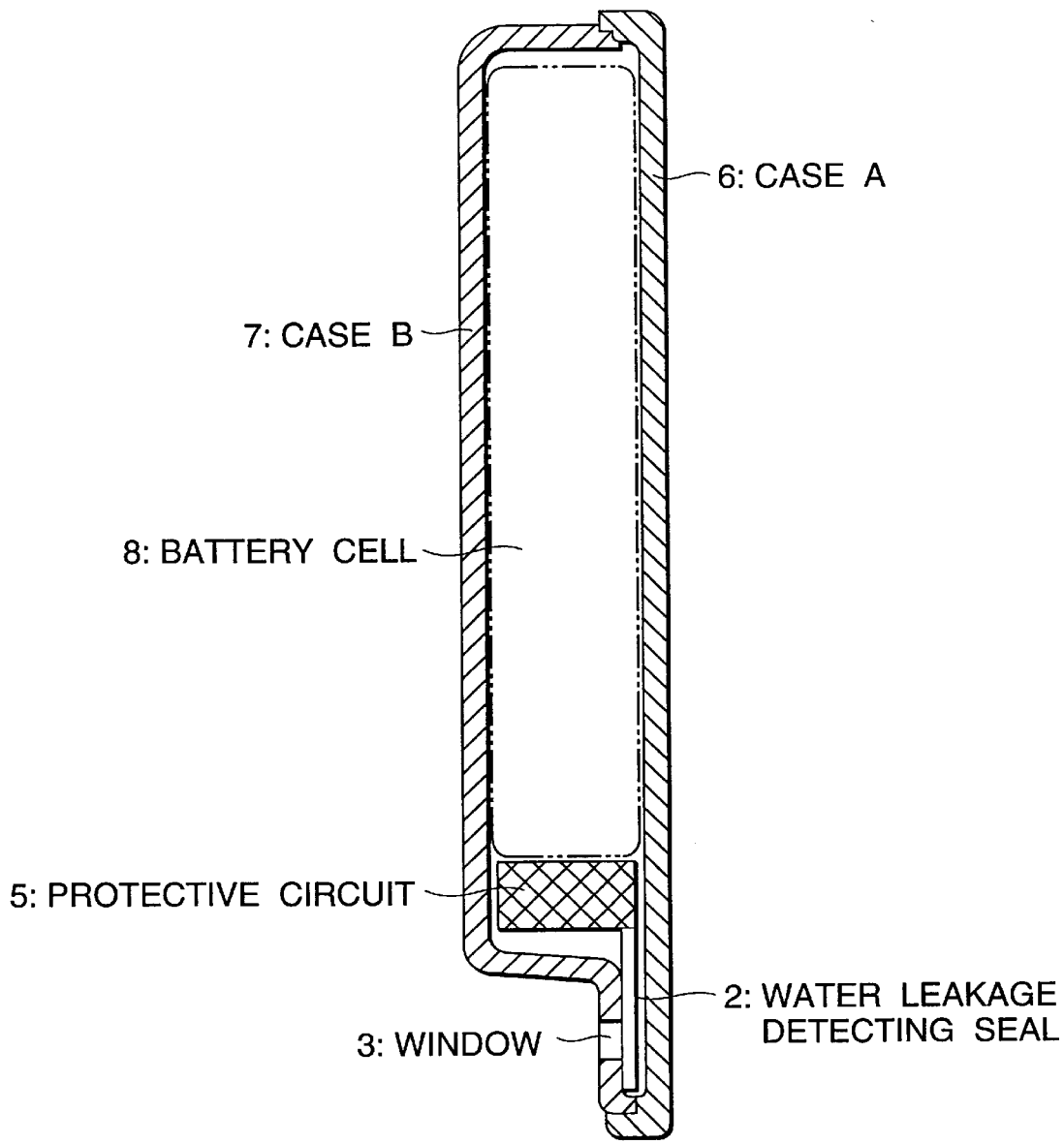
FIG. 2 is a side view in cross section of the battery pack according to the embodiment of the present invention taken along a line A—A in FIG. 1.

FIG. 2 is a side view in cross section of the battery pack of the present invention taken along a line A—A in FIG. 1. In FIG. 2, the battery pack 1 is so constructed that a battery cell 8 and a protective circuit 5 for protecting the battery are provided between a case A (a first case) 6 and a case B (a second case) 7 and the water leakage detecting seal 2 is arranged in the rear of a window 3 in such a way that the detecting seal 2 is sandwiched between the case A 6 and the case B 7.

Figure 3:
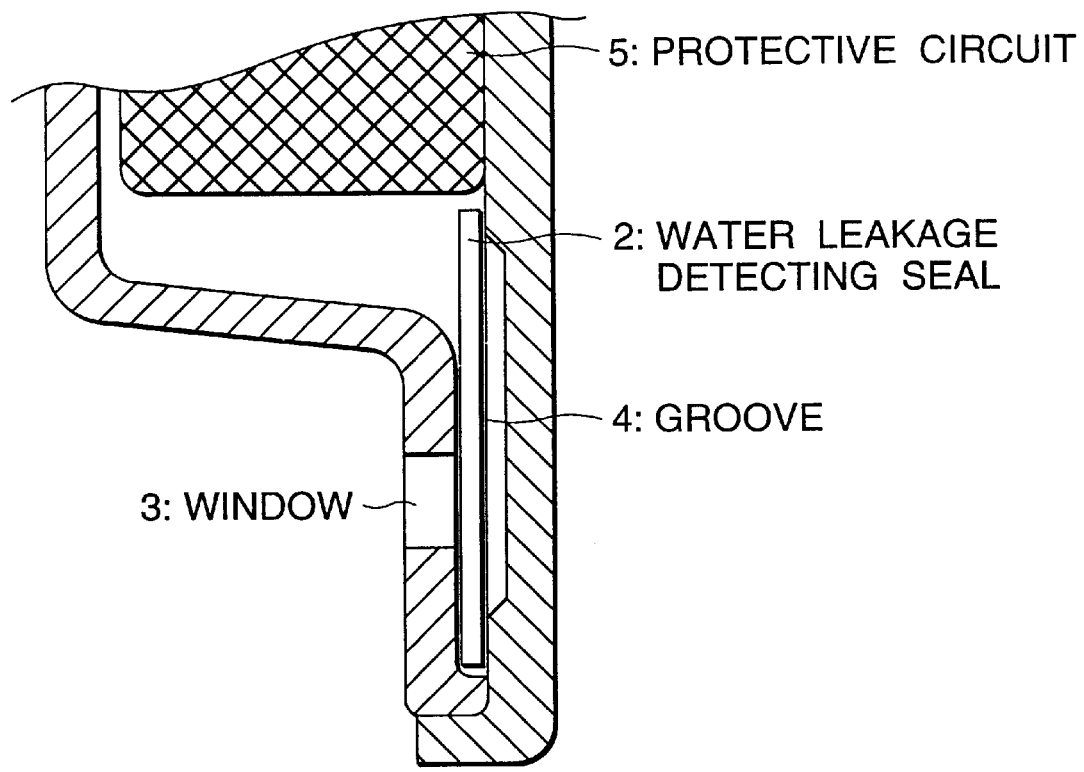
FIG. 3 is an enlarged side view in cross section of a part of FIG. 2.

FIG. 3 is an enlarged side view in cross section of a part of FIG. 2. In FIG. 3, a portion of the water leakage detecting seal 2 is extended up to an area adjacent to the protective circuit 5 and arranged in the rear of the window 3 formed in the case B 7 in such a way that the water leakage detecting seal 2 is sandwiched between the case A 6 and the case B 7. In addition, grooves 4 are formed in the case A 6 on a face thereof facing with the water leakage detecting seal 2. This structure will facilitate an intrusion of water and attain a quick response of the detecting seal to the water leakage.

Figure 4:
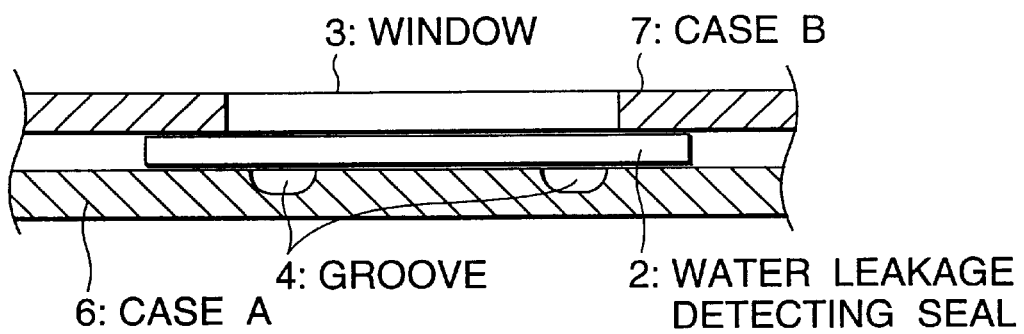
FIG. 4 is a side view in cross section of the battery pack of the present invention taken along a line B—B in FIG. 1.

FIG. 4 is a side view in cross section of the battery pack according to the present invention taken along a line B—B in FIG. 1. In FIG. 4, it will be understood that the water leakage detecting seal 2 is located below the window 3 in a sandwiched way between the case A 6 and the case B 7. There exists a gap between the water detecting seal 2 and the window 3 so that water is easy to enter through the window 3. Further, as the seal 2 is pressed with the cases A and B except areas where grooves 4 are formed, the seal 2 will not be peeled off by the pressure from the outside through the window 3. Moreover, water can easily enter due to the presence of the grooves 4, and the detecting seal 2 can rapidly respond to the water leakage.

As obvious from the foregoing, this invention is characterized by the battery pack comprising the protective circuit for protecting the battery, the first case, the second case, the battery cell, and the water leakage detecting seal provided adjacent to the protective circuit for protecting the battery in the rear of the window formed in the first case in a sandwiched way between the first case and the second case. This structure has such an effect that water can easily intrude therein and the response to the water leakage will be expedited.

Figure 5:
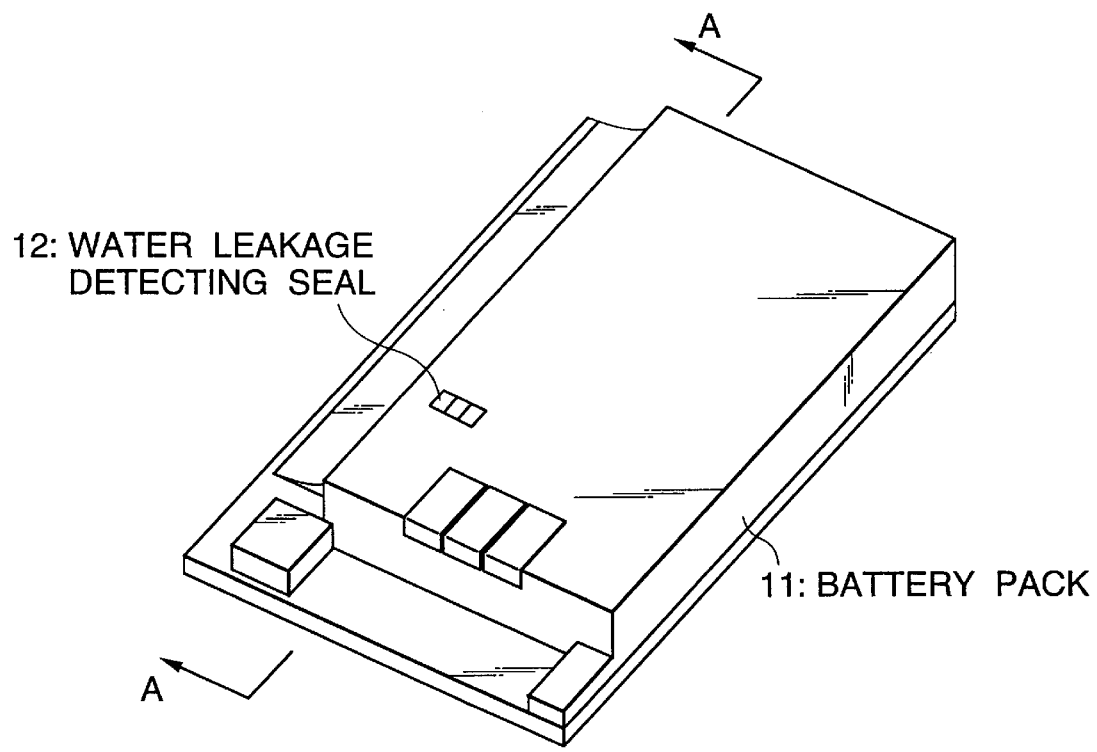
FIG. 5 is a perspective view showing a structure of the conventional battery pack with a water leakage detecting seal.
Figure 6:
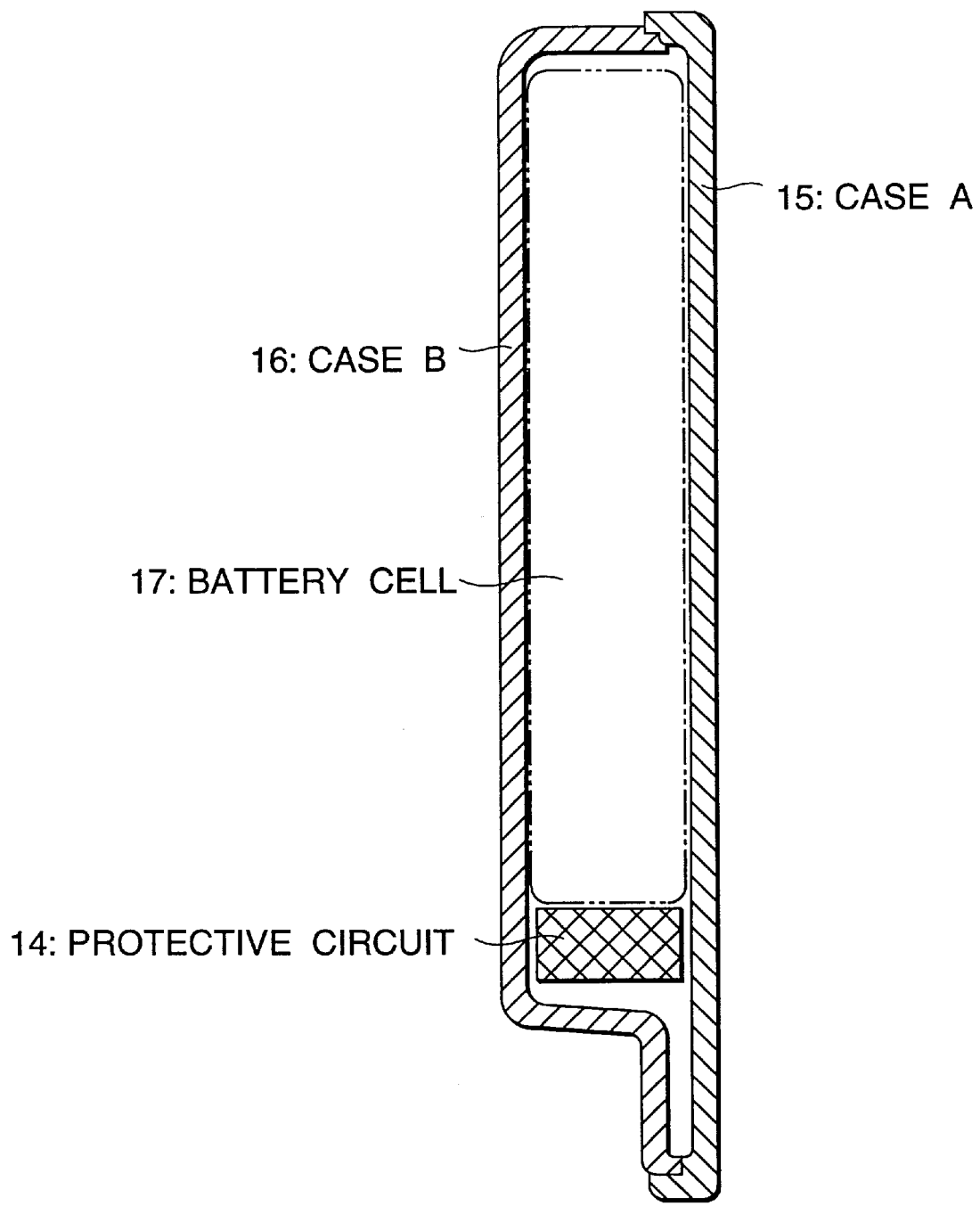
FIG. 6 is a side view in cross section of the battery pack taken along a line A—A in FIG. 5.
Figure 7:
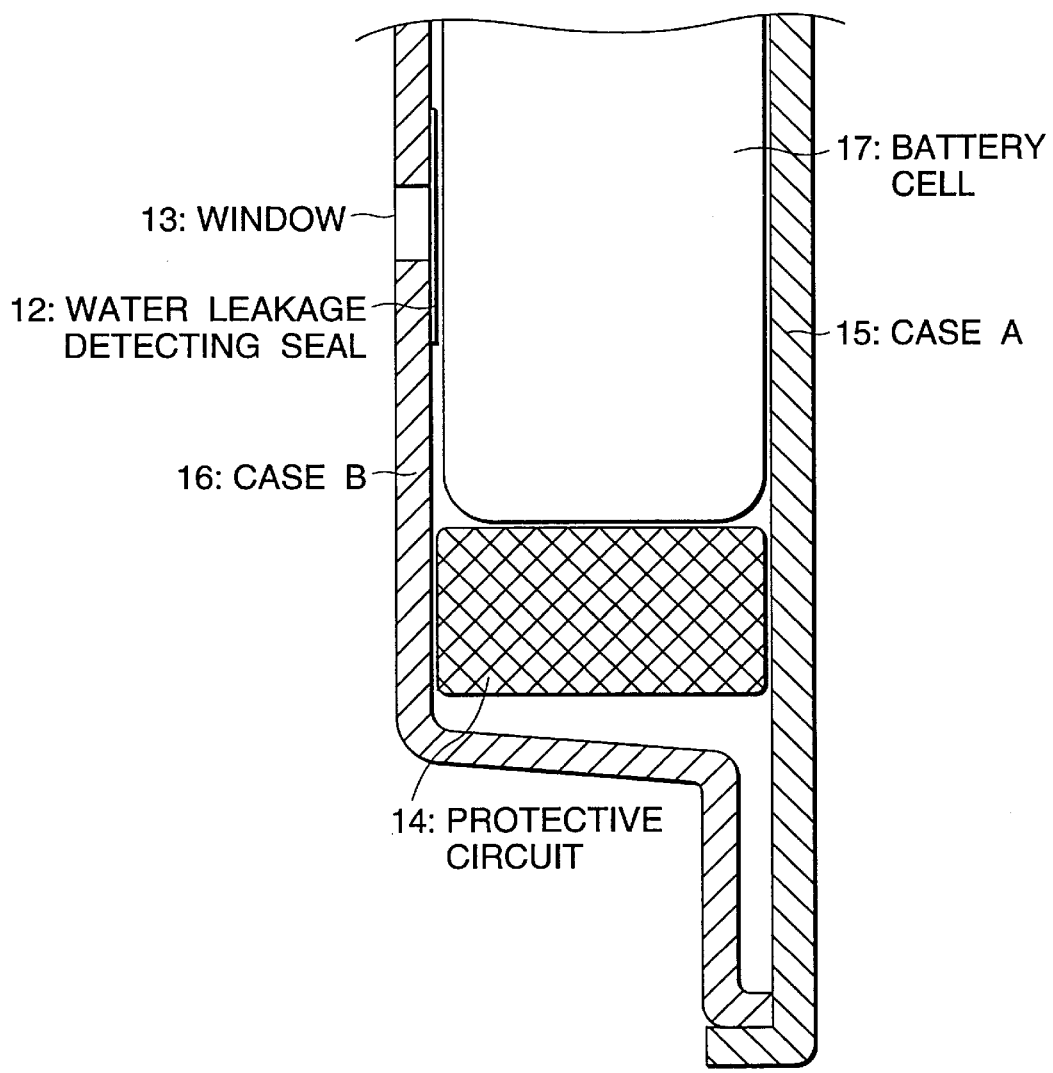
FIG. 7 is an enlarged side view in cross section of a part of FIG. 6.

FIG. 1:
1 Battery pack
2 Water leakage detecting seal
FIG. 2:
2 Water leakage detecting seal
3 Window
58 Protective circuit
6 Case A
7 Case B
8 Battery cell
9 Section along a line A—A
FIG. 3:
2 Water leakage detecting seal
3 Window
4 Groove
5 Protective circuit
FIG. 4:
2 Water leakage detecting seal
3 Window
4 Groove
6 Case A
7 Case B
q Section along a line B—B
FIG. 5:
11 Battery pack
12 Water leakage detecting seal
FIG. 6:
14 Protective circuit
15 Case A
16 Case B
17 Battery cell
p Section along a line A—A
FIG. 7:
12 Water leakage detecting seal
13 Window
14 Protective circuit
15 Case A
16 Case B
17 Battery cell

What is claimed is:

1. A battery pack comprising:

a protective circuit for protecting a battery, a first case, a second case, a battery cell, and a water leakage detecting seal arranged adjacent to said protective circuit for protecting said battery in the rear of a window formed in said first case so as to sandwitch said water leakage detecting seal between said first case and said second case.

2. The battery pack as claimed in claim 1, wherein a portion of said water leakage detecting seal is extended to an area adjacent to said protective circuit.

3. The battery pack as claimed in claim 1, wherein said first case is provided with grooves so that said water leakage detecting seal is easy to respond to water running through said grooves.

4. The battery pack as claimed in claim 1, wherein a face of said first case facing with said water leakage detecting seal except said grooves is parallel to said window so as to prevent said water leakage detecting seal from being peeled off with a pressure from the outside through the window.

5. A mobile radio apparatus provided with a battery pack with a water leakage detecting seal as claimed in claim 1.

* * * * *